US011788315B1

(12) United States Patent
Jones

(10) Patent No.: US 11,788,315 B1
(45) Date of Patent: Oct. 17, 2023

(54) ACTIVE BEAM JOINT BRACE

(71) Applicant: Charles M. Jones, Woodridge, IL (US)

(72) Inventor: Charles M. Jones, Woodridge, IL (US)

( * ) Notice: Subject to any disclaimer, the term of this patent is extended or adjusted under 35 U.S.C. 154(b) by 0 days.

(21) Appl. No.: 18/211,270

(22) Filed: Jun. 18, 2023

(51) Int. Cl.
*E04H 9/02* (2006.01)
*G01B 21/24* (2006.01)
*E04H 9/14* (2006.01)

(52) U.S. Cl.
CPC ............ *E04H 9/0237* (2020.05); *E04H 9/14* (2013.01); *G01B 21/24* (2013.01)

(58) Field of Classification Search
USPC .............................................. 52/167.1, 167.3
See application file for complete search history.

(56) References Cited

U.S. PATENT DOCUMENTS

| | | | | |
|---|---|---|---|---|
| 4,922,667 A * | 5/1990 | Kobori | ................. | E04H 9/0237 52/167.2 |
| 5,065,552 A * | 11/1991 | Kobori | ................. | E04H 9/0235 52/167.3 |
| 6,247,275 B1 * | 6/2001 | Taylor | ................. | E04H 9/0237 52/167.3 |
| 6,397,528 B1 * | 6/2002 | Rahimian | ............. | E04H 9/0237 52/167.3 |
| 6,438,905 B2 * | 8/2002 | Constantinou | ........ | E04H 9/0235 52/167.3 |
| 9,540,807 B2 * | 1/2017 | Ueno | ................... | E04G 23/0218 |
| 10,352,058 B2 * | 7/2019 | Towfighi | .................... | E04B 1/36 |
| 11,441,311 B1 * | 9/2022 | Gant | ......................... | E04B 1/98 |
| 2018/0334826 A1 * | 11/2018 | Towfighi | ............... | E04H 9/0237 |

* cited by examiner

*Primary Examiner* — Joshua K Ihezie

(57) ABSTRACT

The Active Beam Joint Brace (ABJB) is an improvement or a compliment to the current technology of protecting steel beam structured buildings such as tuned mass dampers near the top floors of sky scrapers and large shock absorbers to reduce sway due to high winds and earthquakes. The ABJB can be also used in any type of structure i.e. bridges. It is positioned near the joint of two of the beams and therefore does not interfere with the placement of doors and windows. There are two embodiments of the ABJB:
 1. A basic ABJB
 2. A smart ABJB
The basic ABJB reacts to any distortion of the protected beam joint and applies a counter force to the two beams in than joint.
The smart ABJB is also able to forecast some of the remaining wave forces in an earthquakes duration (from the first wave forms) and proactively apply counter forces (i.e. a Rayleigh Wave). It may also adjust the frequency, magnitude and direction in combination with the other ABJB's in the structure based on the properties of the external force on the structure.
Additional sensors, such as strain gauges, wind speed sensors, wind direction sensors and accelerometers can be used to gather more data about any distortion of the beam structure which can then be utilized with an intelligent algorithm to forecast and proactively resist the beam structure from distorting due to external forces.

3 Claims, 15 Drawing Sheets

ACTIVE BEAM JOINT BRACE

TECHNICAL FIELD OF THE INVENTION

This invention relates generally to beam structure integrity when exposed to external forces such as wind or earthquakes, more specifically, to minimizing the distortion of a beam structure in a high-rise building or in a bridge by producing internal forces to counteract the external force.

BACKGROUND OF THE INVENTION—PRIOR ART

There are at least two types of external forces that threaten the structural integrity of beam structures: wind and earthquakes. Damage can occur when the external force causes the structure to distort or to resonate at one of its natural frequencies.

Wind: A 1,000 ft building may sway several inches on windy days. With 50 mph winds, such a tower may move approximately six inches. In the rare event of 100 mph gusts, a structure could move up to two feet, the New York Times reported in 2021. The world's thinnest skyscraper and one of the tallest buildings in the United States, the Steinway tower, at a height of 1428 feet tall, will sway up to five feet during storms. It has two tuned mass dampers to counteract the external forces. As high-rise towers continue to grow taller, the global mass damper market is also expected to grow to $146 million USD by 2028. Another problem with high-rise building swaying is how it affects the people inside. If the building moves a substantial horizontal distance, the occupants on higher floors will definitely feel it. According to research (new in March 2017), skyscrapers could be bad for the residents of high-rises as the high-rise building vibrates and sways in the wind. Swaying high-rise buildings may trigger motion-sickness, insomnia and depression. Excessive swaying of a high-rise building may also decrease the value of the homes and offices especially on the upper floors.

Bridges are structures that can also be affected by the wind. One of the most famous bridge events is the Tacoma Narrows Bridge collapse in 1940 swinging at one of its natural frequencies which had been captured on film. The cause is still debated but some combination of high wind, aeroelastic flutter, vortex shedding and the natural frequencies of the bridge seemed to be the culprits. An example that most folks can relate to is the properly timed pushes of a child on a swing can cause its arc to increase.

Earthquakes: While wind forces are typically distributed as a gradient on one wall on a building, earthquake forces are in the form of a sudden jerking or shaking force on the foundation of the building which causes the cantilevered building to swing back and forth. If that swinging is near the natural frequency of the structure damage can occur. The natural frequency of a building or other structure is the frequency at which a system oscillates when not subjected to a continuous or repeated external force. This is important because resonance can occur when a structure starts oscillating near its natural frequency. Resonance is the tendency of a system to oscillate with greater amplitude. Engineers typically calculate the natural frequency of the structures that can be affected by earthquakes or high winds.

Once the natural frequencies of a building, or structure, have been calculated then active beam joint braces with their motion detectors can be installed near the locations of maximum vibration thereby reducing the chance of the building going into resonance.

During the 1985 Mexico earthquake, the ground vibrated with a two second period for over a minute. Medium height buildings suffered the most damage while short buildings and skyscrapers were relatively undamaged. That is because the medium height buildings have a natural frequency near the earthquake frequency and began to resonate.

Through the years many buildings with inferior structures were destroyed by earthquakes. Some 28,000 buildings were destroyed in the Apr. 18, 1906 earthquake of San Francisco. Approximately 24,671 were made from wood and 3,168 were made from brick.

On Feb. 8, 2016 in Tainan, Taiwan the Weiguan Jinlong high-rise building collapsed in a magnitude 6.4 earthquake killing at least 54 people. Five days later, more than 100 people remained missing. Poor building methods were determined to be the cause of the failure of the structure.

As recent as Jun. 24, 2021, the Champlain Towers South, a 12-story beachfront condominium in the Miami suburb of Surfside, Florida, United States, partially collapsed. Ninety-eight people died. The Champlain complex was a steel-reinforced concrete structure. There were no reports of an earthquake but this catastrophe showed the need for building code enforcement.

Earthquakes typically generate four main types of seismic waves: P waves, S waves, Love waves and Rayleigh waves. Love waves cause damage to structures by moving the earth horizontally. Rayleigh waves cause damage by moving the earth vertically. P waves produce a horizontal expansion and compression of the earth. S weaves move the earth sideways at right angles to their direction of travel.

The current state of the art of minimizing the distortion of a beam structure exposed to external forces such as in high rise buildings has seen a number of clever innovations:

1. Tuned mass dampers to reduce mechanical vibrations from external forces in structures. A large mass tends to remain in place when a structure moves thus pulling the structure back to its original orientation. The mass can be solid or liquid. A tuned mass damper is a giant mass made of steel, concrete or liquid that may weighs anywhere from 300 to 800 tons and counteracts the tendency of the building to sway by using springs and/or pistons. Many patents have been issued on methods and devices that use these types of passive dampers.
2. Fluid viscous dampers which are essentially large shock absorbers that resist structural movement from external forces. Many patents have also been issued on methods and devices that use these types of passive dampers.
3. Profiles that reduce the wing-like effect of a high-rise building in the wind, such as, rounded corners, openings in buildings, step-back designs have also reduced the effect of wind on high-rises.

The only reference found to an active system (such as the present invention) is in an expired U.S. Pat. No. 4,922,667 "Device and Method for Protecting a Building Against Earthquake Tremors" by Kobori et al. However, his invention requires that a beam connects to the two diagonally opposing corners of a rectangular structure of beams as his drawings indicate (i.e. not a single joint). Unfortunately his design interferes with the windows and doors that go inside many of the rectangular openings in the beam structure of a high rise building. Additionally, the cost of very long beams and solenoids make his invention expensive. His invention mentions earthquake threats on buildings, however, there is no mention of wind shear on high rise buildings.

SUMMARY

The present invention is an active beam joint brace and method to counteract the external forces on the beam structures that overcome the problems in the prior art, including wind and earthquake threats. The wind sway problem is a much more common problem than the earthquake problem. The present invention only spans one corner of a rectangular beam structure (not the two diagonally opposing corners). Therefore it does not interfere with the placement of doors and windows.

In the case of a wind external force, specifically a persistent directional high wind, the windward side of the building is stretched, the leeward side is compressed and the high-rise building structure will tend to bend away from the wind. The present invention automatically takes corrective action to resist the tendency of a building to sway in high wind. A number of active beam joint braces are installed near the joint corner of two joined beams to apply a counteractive force on the beams distorted the joint. This is analogous to a person facing into a high wind which will cause his muscles and skeleton to "lean into the wind". Likewise, the powered solenoids (the muscles) will push on the structural beams (the skeleton) in a high-rise beam structure in order to keep the building from bending from the persistent wind. A second analogy is a parent pushing their child on a swing with the frequency of the swing will cause the swing to increase its arc. By pushing on the swing against its frequency will cause it to decrease its arc. In the case of an earthquake, a person standing on the ground would react to try to counteract the sudden movement of the ground under his feet by flexing his knees. This is analogous to the powered solenoids exerting a strategic force on the beam joints in order to minimize the structure from distorting.

Additional sensors, such as strain gauges, wind speed sensors, wind direction sensors and accelerometers can be used to gather more data about any distortion of the beam structure which can be utilized with an intelligent algorithm to forecast and proactively resist the beam structure from distorting due to external forces. That data can then be input to the intelligent pro-active forecasting system to apply counter forces to mitigate the distortion of the structure.

There are two embodiments of the present invention presented. The first is a reactive system with no computer needed for calculations. When the active beam joint brace detects a physical displacement with a movement detector, it automatically reacts by imposing a physical force on the two beams in the beam joint to reduce the physical displacement.

The second embodiment includes a computer with algorithms to imposing more sophisticated physical force patterns on the two joined beams in the beam joint such as those needed to counteract the frequencies of an earthquake wave form.

Forecasting Earthquake Forces: The present invention is not attempting to forecast when an earthquake will occur, but once the first few peaks of the P-wave have been detected (as an early warning system), it can forecast an estimate of the start and shape of the wave forms so that an appropriate counter force can be applied to the beam joints.

There are four identified wave forms in most earthquakes as shown in FIG. 11. The first to be felt by a beam structure in an earthquake is the P-wave because it travels the fastest at approximately six kilometers per second in rock. The second fastest is the S-wave at approximately 3.6-4 kilometers per second in rock. These waves are called body waves since they travel under the surface of the earth. The next two, the Love wave (traveling at approximately 3 kilometers per second) and the Rayleigh wave (traveling at approximately 2-3 kilometers per second).

Another piece of information that is needed a-priori is the natural frequencies of the specific beam structure being protected by a forecasting system. Procedures are well known to obtain the natural frequencies of a beam structure such as modeling the beam structure.

With this information, and with other sensors, a system can be designed to forecast the remaining wave forms in an existing earthquake.

It is possible that the present invention may replace or at least reduce the need for tuned mass dampers. The present invention may also be used in conjunction with tuned mass dampers.

DETAILED DESCRIPTION OF THE PRESENT INVENTION

Figure 1:
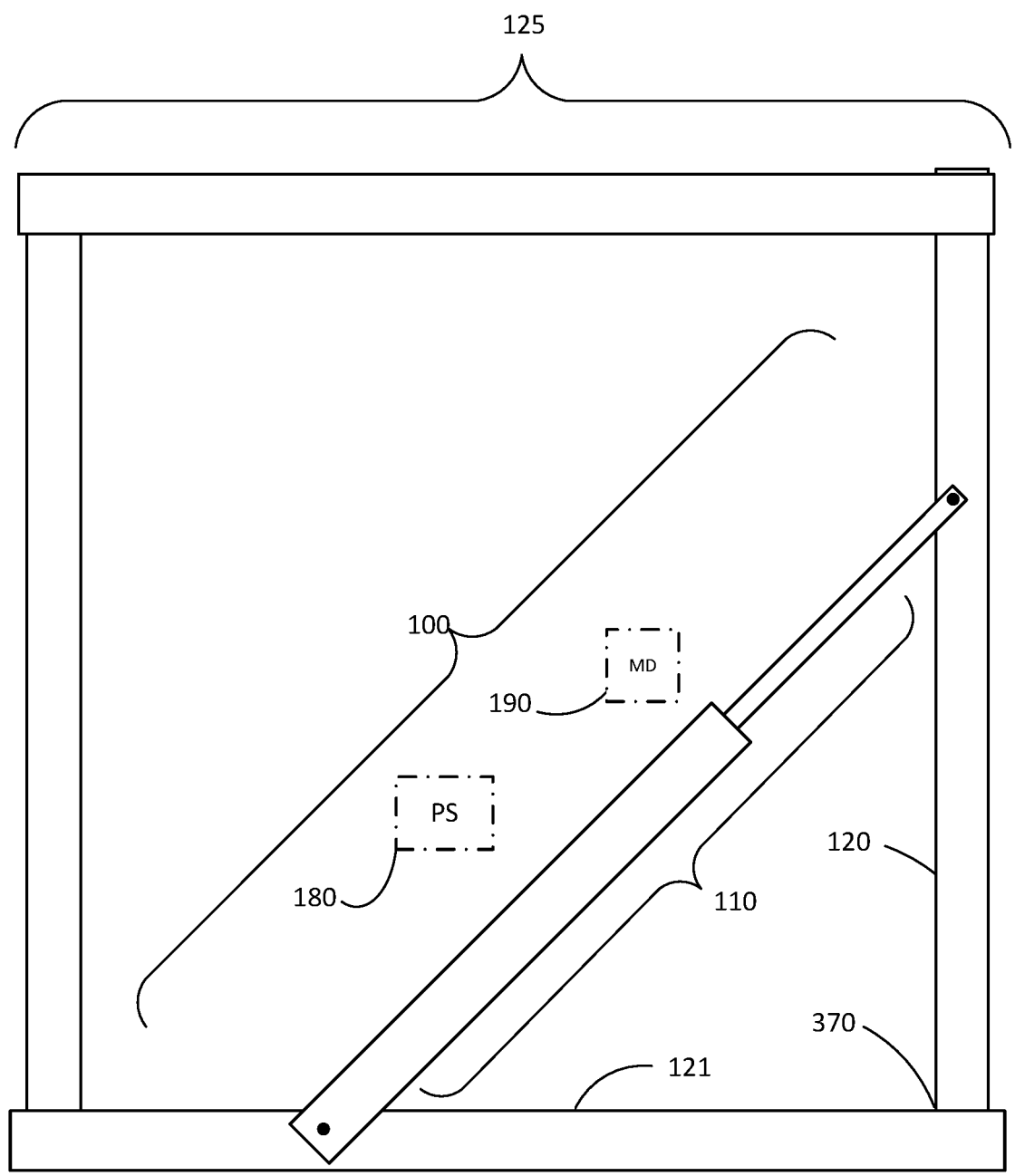
FIG. 1 shows a side view sketch of a first embodiment of the active beam joint brace.

FIG. 1 shows a sketch of the first embodiment of the active beam joint brace 100 comprised of the solenoid 110, the movement detector 190, and the power supply 180. The active beam joint brace is positioned near the intersection 370 of two joined beams 120 and 121 in a beam structure 125. The proximal and distal ends of the solenoid are connected to the two joined beams 120 and 121 in the beam structure 125 at predetermined locations near their intersection 370.

Figure 2:
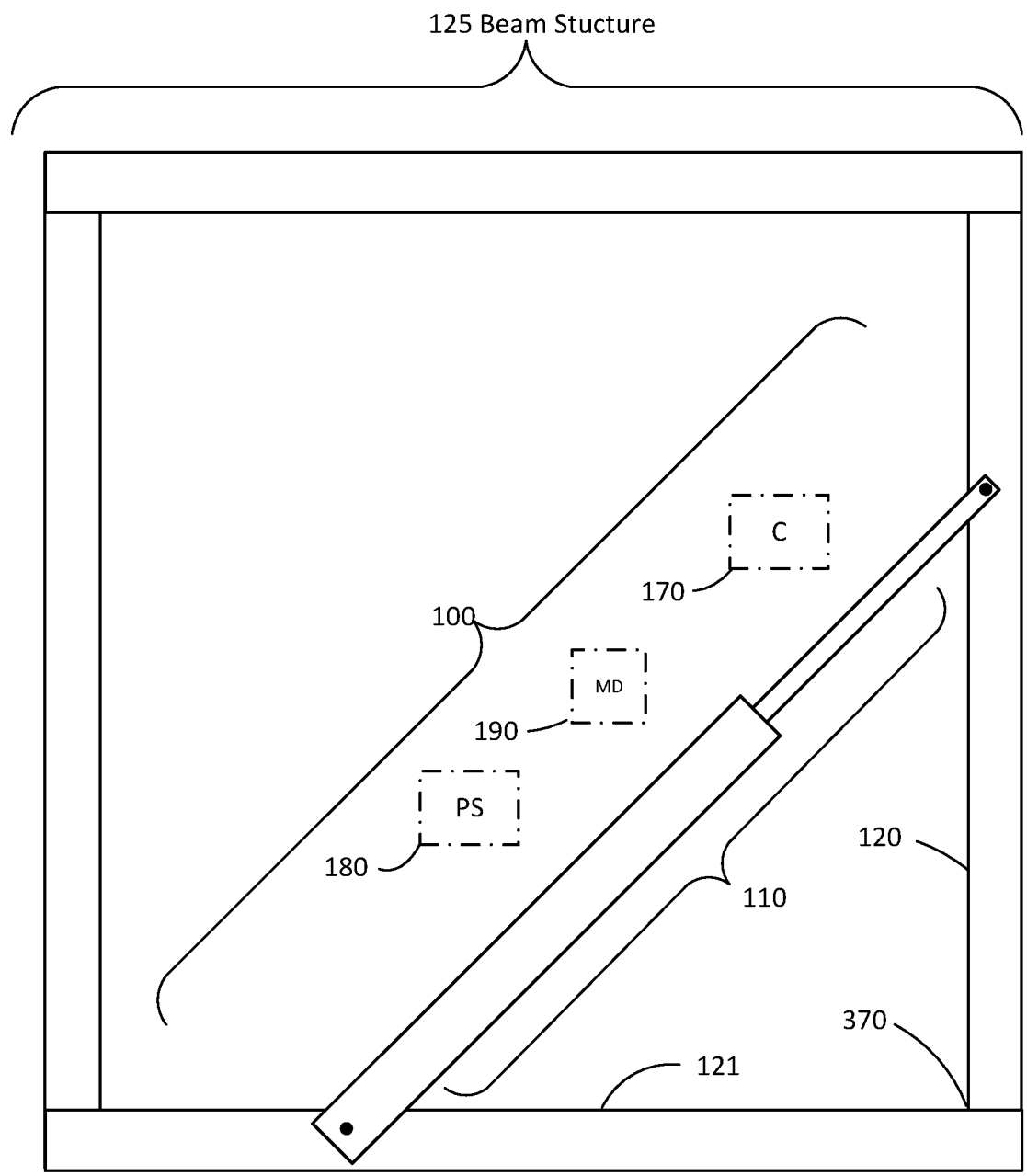
FIG. 2 shows a side view sketch of a second embodiment of the active beam joint brace with a computer included in the design.

FIG. 2 shows a sketch of a second embodiment of the active beam joint brace 100. The second embodiment of the active beam joint brace 100 is comprised of the solenoid 110, the movement detector 190, the computer 170 and the power supply 180. The proximal and distal ends of the solenoid are connected to the two joined beams 120 and 121 in the beam structure 125 at predetermined locations near their intersection 370.

Figure 3:
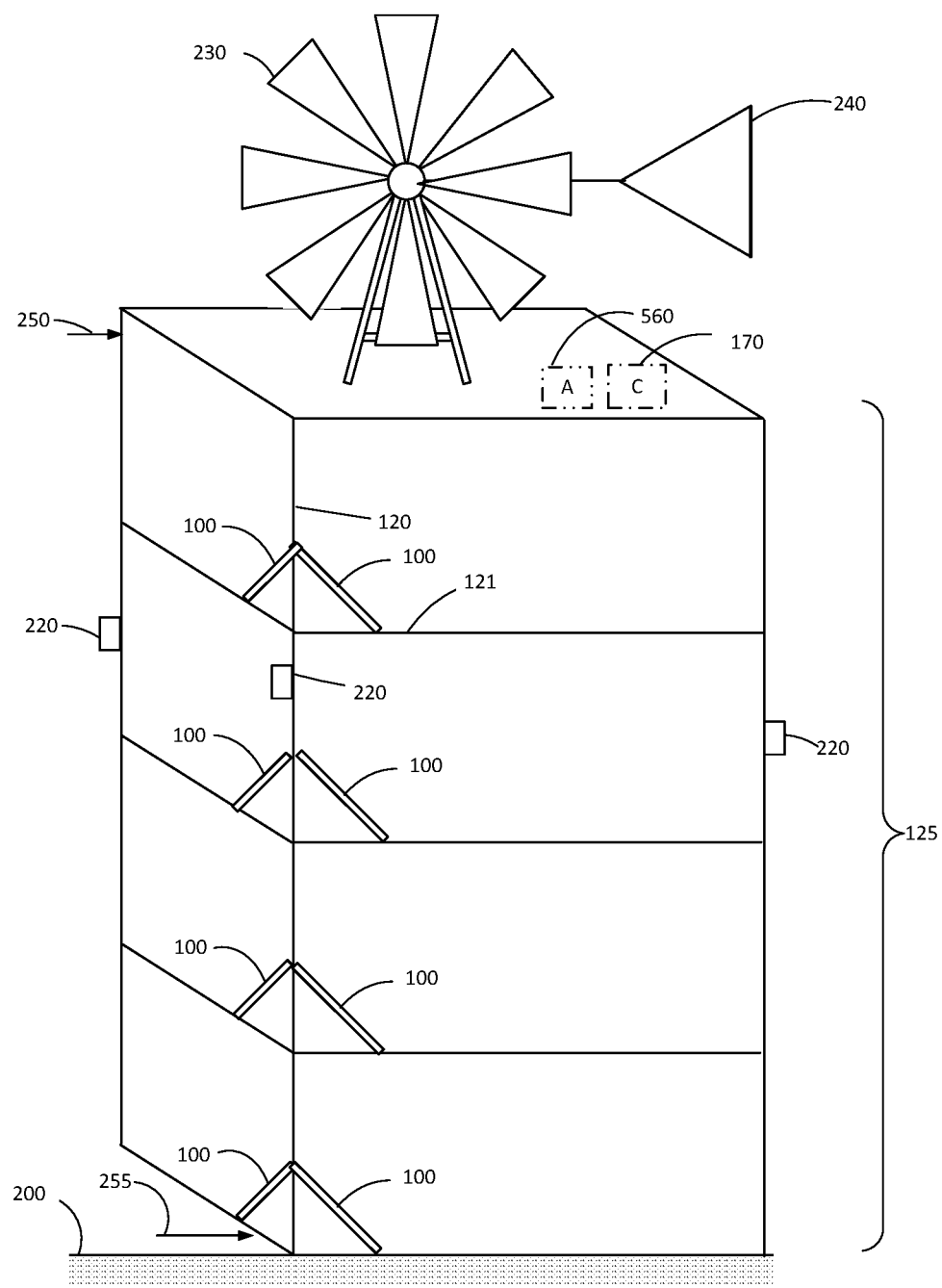
FIG. 3 is a perspective sketch of a multistory building in a foundation with one active beam joint brace installed near one corner of a number of rectangular portions of the beam structure.

FIG. 3 is a perspective sketch of a multistory building in a foundation 200, with one active beam joint brace 100 installed near one corner of a number of rectangular portions of a beam structure 125 which will register movement of the beams in the corner of the structure. Also shown is a wind speed detector 230, a wind direction detector 240, an accelerometer 560, a strain gauge, a wind force 250 on the building structure and an earthquake force 255 on the building structure.

Figure 4A:
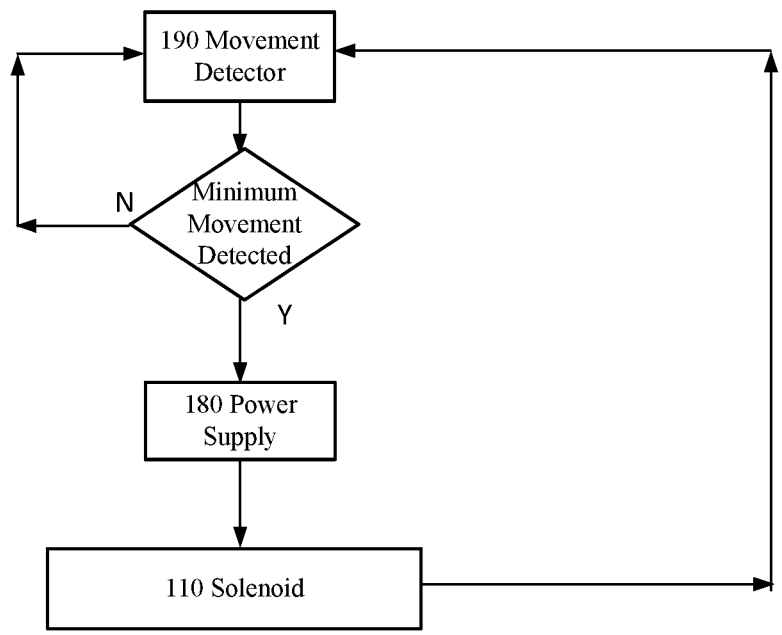
FIG. 4A is a flow chart of the basic logic of embodiment 1 of the active beam joint brace and method for automatically controlling all types of external force threats.

FIG. 4A is a flow chart of the basic logic of embodiment 1 of the active structural beam joint brace for automatically controlling all types of external threats showing the movement detector 190 detecting movement greater than the minimum allowed before triggering a response. The response is communicated to power supply 180 which then activates the solenoid 110.

Figure 4B:
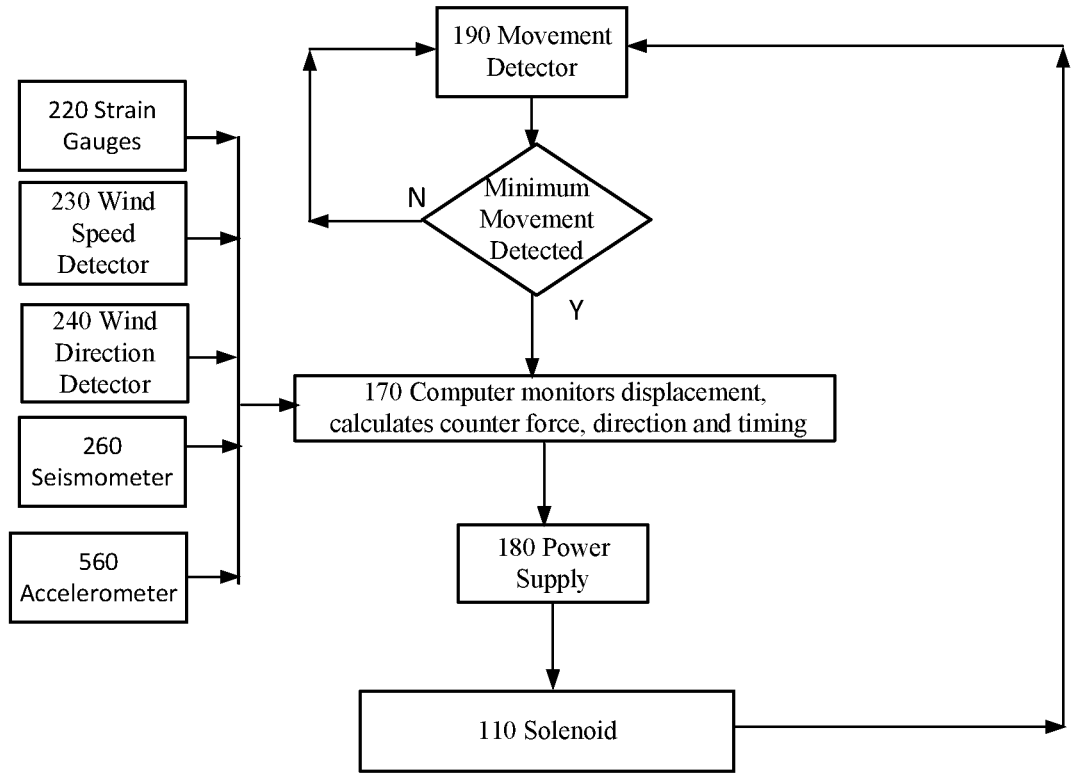
FIG. 4B is a flow chart of the basic logic of embodiment 2 of the active beam joint brace and method for monitoring and controlling all types of external force threats with the use of external threat sensors.

FIG. 4B is a flow chart of the basic logic of embodiment 2 of the active structural beam joint brace for monitoring and controlling all types of external threats with the use of external threat sensors showing the movement detector 190 detecting movement greater than the minimum allowed before triggering a response. The response is communicated to the computer 170 which then determines the magnitude, direction and timing of the responsive force to be exerted by the solenoid 110. Optional sensors, such as strain gauges 220, wind speed detector 230, wind direction detectors 240, seismometers 60 and accelerometers 560 may also report to the computer 170 to provide data for the algorithm to determine magnitude, direction and timing of the responsive force to be exerted by the solenoids 110.

Figure 5:
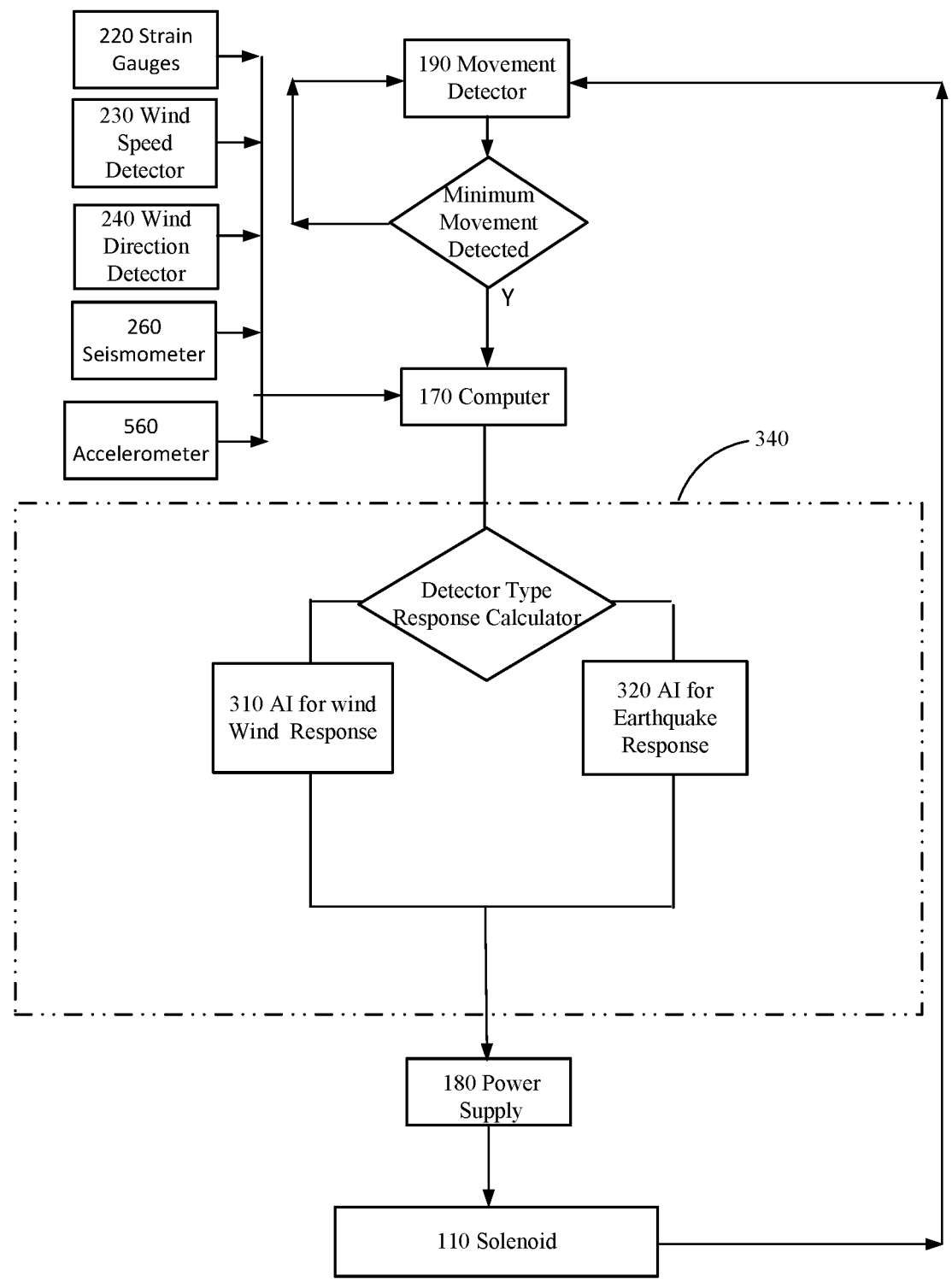
FIG. 5 is a logic flow chart of embodiment 2 of the active beam joint brace method with an artificial intelligent program to handle wind or earthquakes.

FIG. 5 is a flow chart of the logic of embodiment 2 of the active structural beam joint brace with an artificial intelligent program to calculate an intelligent response (magnitude, direction and duration) to the reading on the movement detector 190 from wind or earthquakes. If the reading is greater than the minimum allowed before triggering a response, the response is communicated to the computer 170 which determines what type of threat (wind 310 or earthquake 320) and an intelligent A.I. response to communicate with the power supply 180 which then activates the solenoid 110 with the intelligent response. Optional sensors, such as strain gauges 220, wind speed detector 230, wind direction detectors 240, seismometers 260 and accelerometers 560 may also report to the computer 170 to provide data for the algorithm to determine magnitude, direction and timing of the responsive force to be exerted by the solenoids 110.

Figure 6:
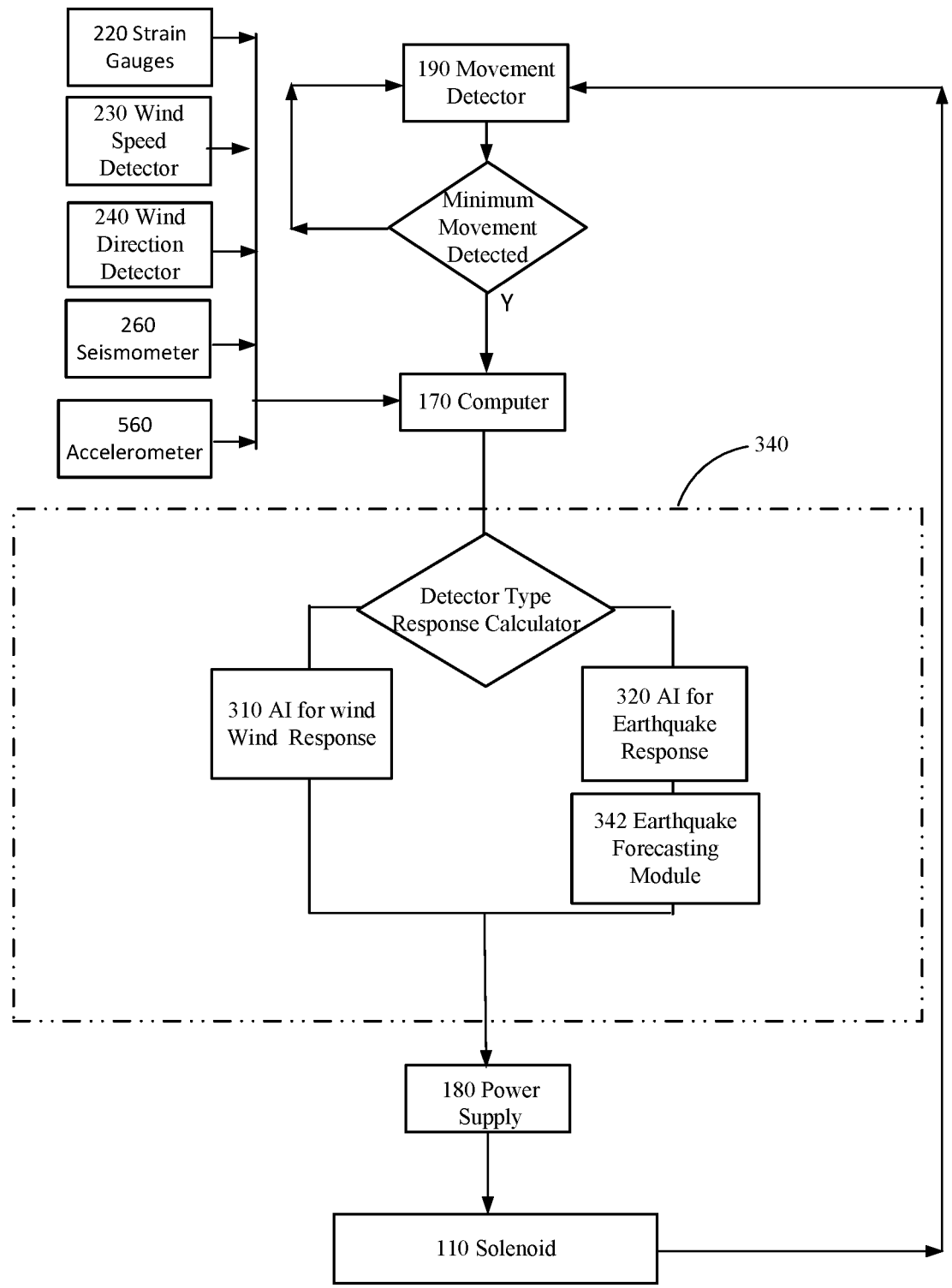
FIG. 6 is a logic flow chart of embodiment 2 of the active beam joint brace method with an artificial intelligent program and an earthquake forecasting module (after the earthquake has already been detected).

FIG. 6 is similar to FIG. 5 except an earthquake forecasting module 342 has been added to the logic flow for the earthquake type threat after the initial magnitude and frequency of the earthquake has been detected.

Figure 7A:
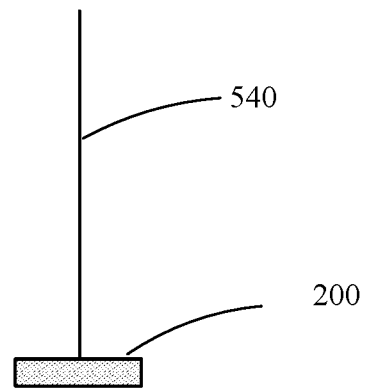
FIG. 7A shows a simplified stick model of a building with no wind or earthquake, at its equilibrium position.

FIG. 7A shows a simplified stick model of a building (one beam 540) with no wind or earthquake, at its equilibrium position.

Figure 7B:
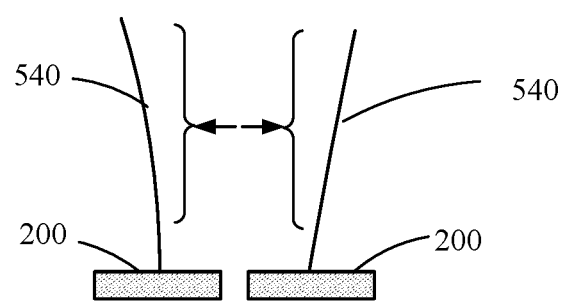
FIG. 7B shows the building swaying in the wind. (Two views with the wind in opposite directions).

FIG. 7B shows the building swaying 540 in the wind.

Figure 7C:
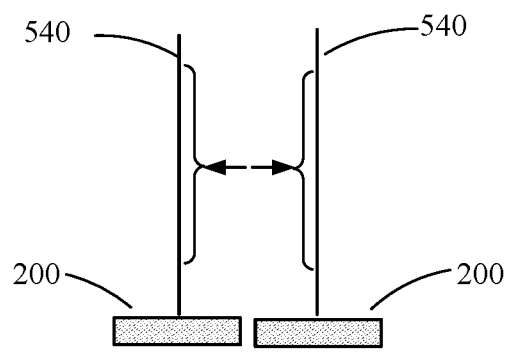
FIG. 7C shows the building being hit by the wind but kept relative rigid because of the active beam joint braces. (Two views with the wind in opposite directions).

FIG. 7C shows the building 540 in its foundation 200 being hit by the wind but kept relatively rigid with the active beam joint braces. (Two views with the wind in opposite directions).

Figure 8A:
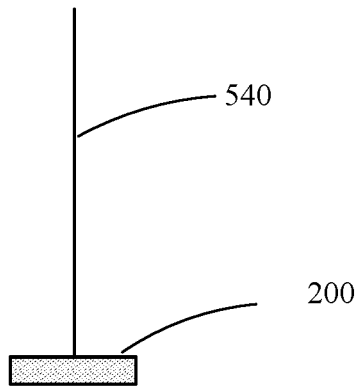
FIG. 8A shows a simplified stick model of a building in its foundation with no wind or earthquake, at its equilibrium position.

FIG. 8A shows a simplified stick model of a building (one beam 540) in its foundation 200 with no wind or earthquake, at its equilibrium position.

Figure 8B:
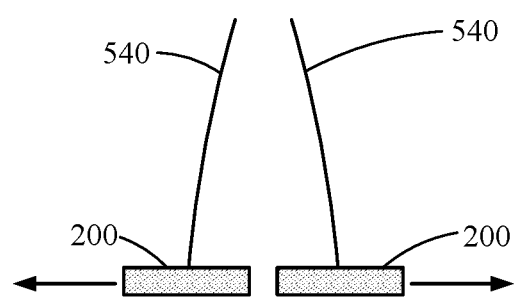
FIG. 8B shows the building unconstrained in an earthquake with the beam structure distorted. (Two views with the earthquake force in opposite directions).

FIG. 8B shows the building 540 swaying unconstrained from an earthquake with the beam structure distorting.

Figure 8C:
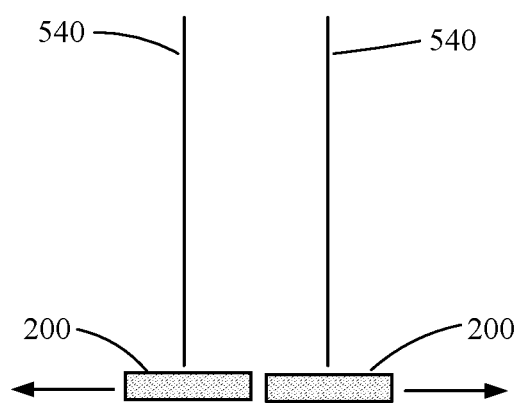
FIG. 8C shows the building in an earthquake with the beam structure relatively undistorted because of the active beam joint braces. (Two views with the earthquake force in opposite directions).

FIG. 8C shows the building 540 in an earthquake with the beam structure relatively undistorted with the active beam joint braces. (Two views with the earthquake force in opposite directions).

Figure 9:
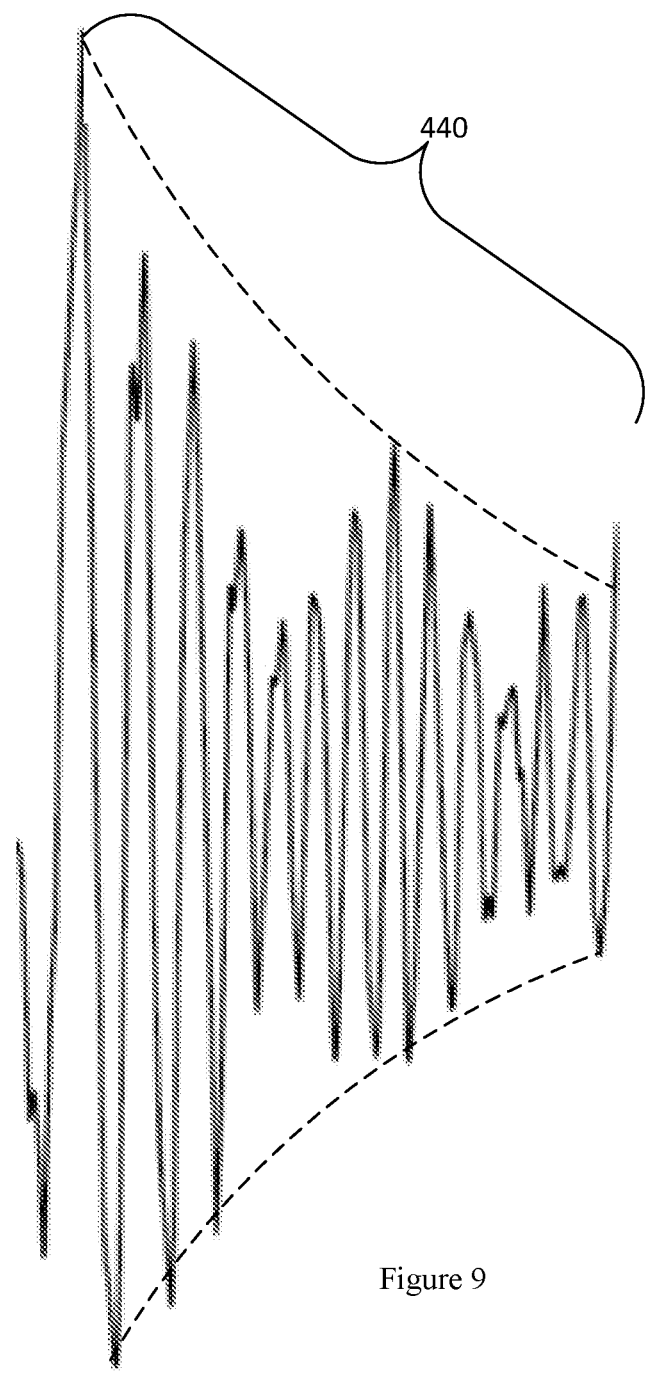
FIG. 9 shows a snapshot of a typical Rayleigh wave form with its predictable periods and decay.

FIG. 9 shows a snapshot of a typical Rayleigh wave form 440 with its predictable periods and decay rate. Once the start of the Rayleigh wave form is forecasted or detected and a few periods of peaks are observed, the decay rate and timing can then be forecasted. Then an A.I. program or even a simple regression analysis can be used to calculate the appropriate counter force to apply to the active beam joint braces.

Figure 10:
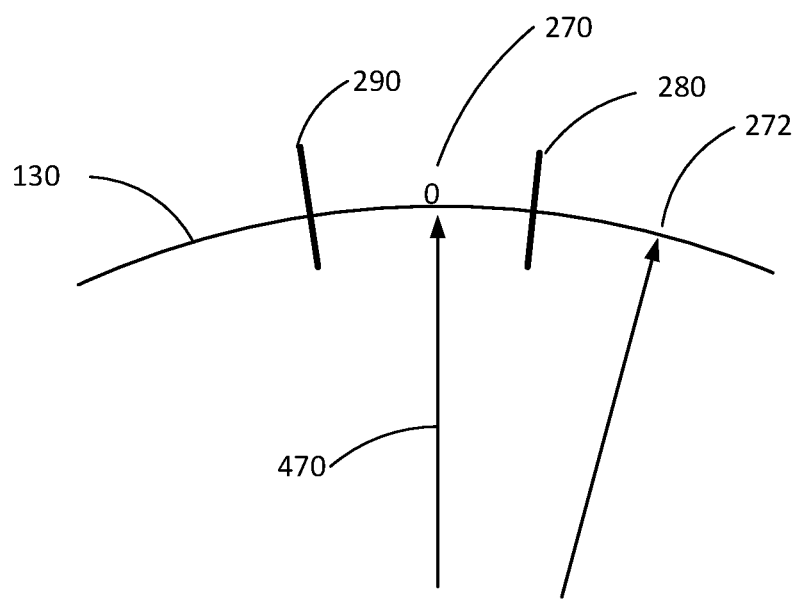
FIG. 10 shows the movement scale on the mechanical movement detector with the indicator arrow at its equilibrium point.

FIG. 10 shows the movement detector scale 130 with the indicator arrow 470 at its equilibrium point 270, a lower 290 trigger threshold and an upper 280 trigger threshold. If the indicator arrow moves past the upper trigger 280 (i.e. to position 272 on the scale then the upper trigger would be triggered and a corresponding counteracting force would be applied to the beam joint.

Figure 11:
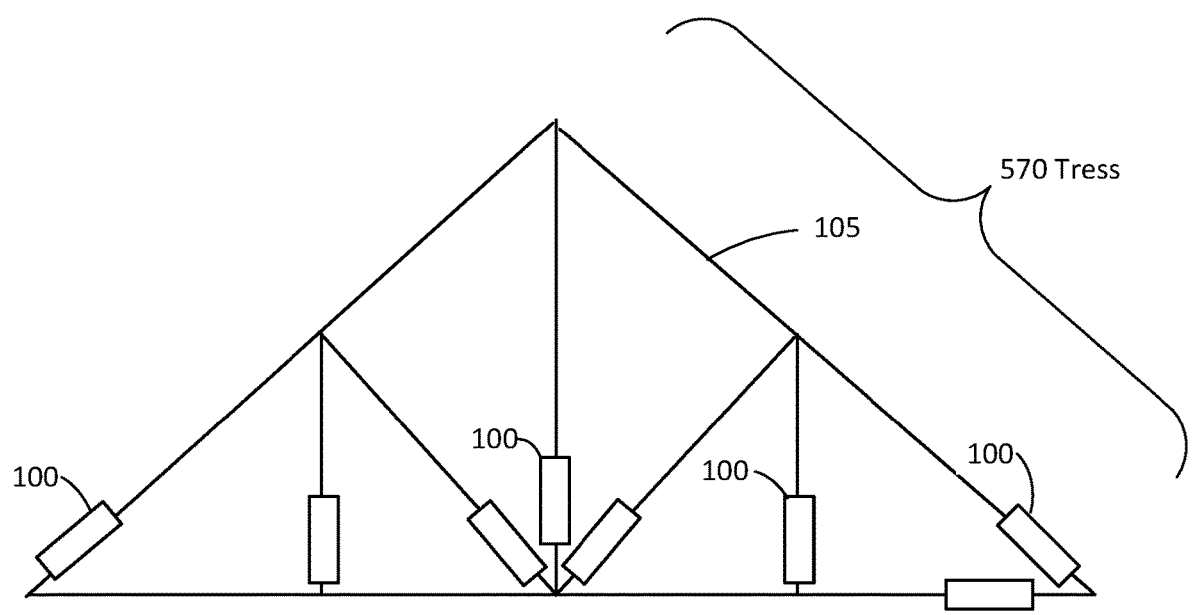
FIG. 11 is a sketch of a tress or a bridge beam structure with active beam joint braces installed.

FIG. 11 is a sketch of a tress or a bridge 570 beam structure with a number of active beam joint braces 100 installed.

Figure 12:
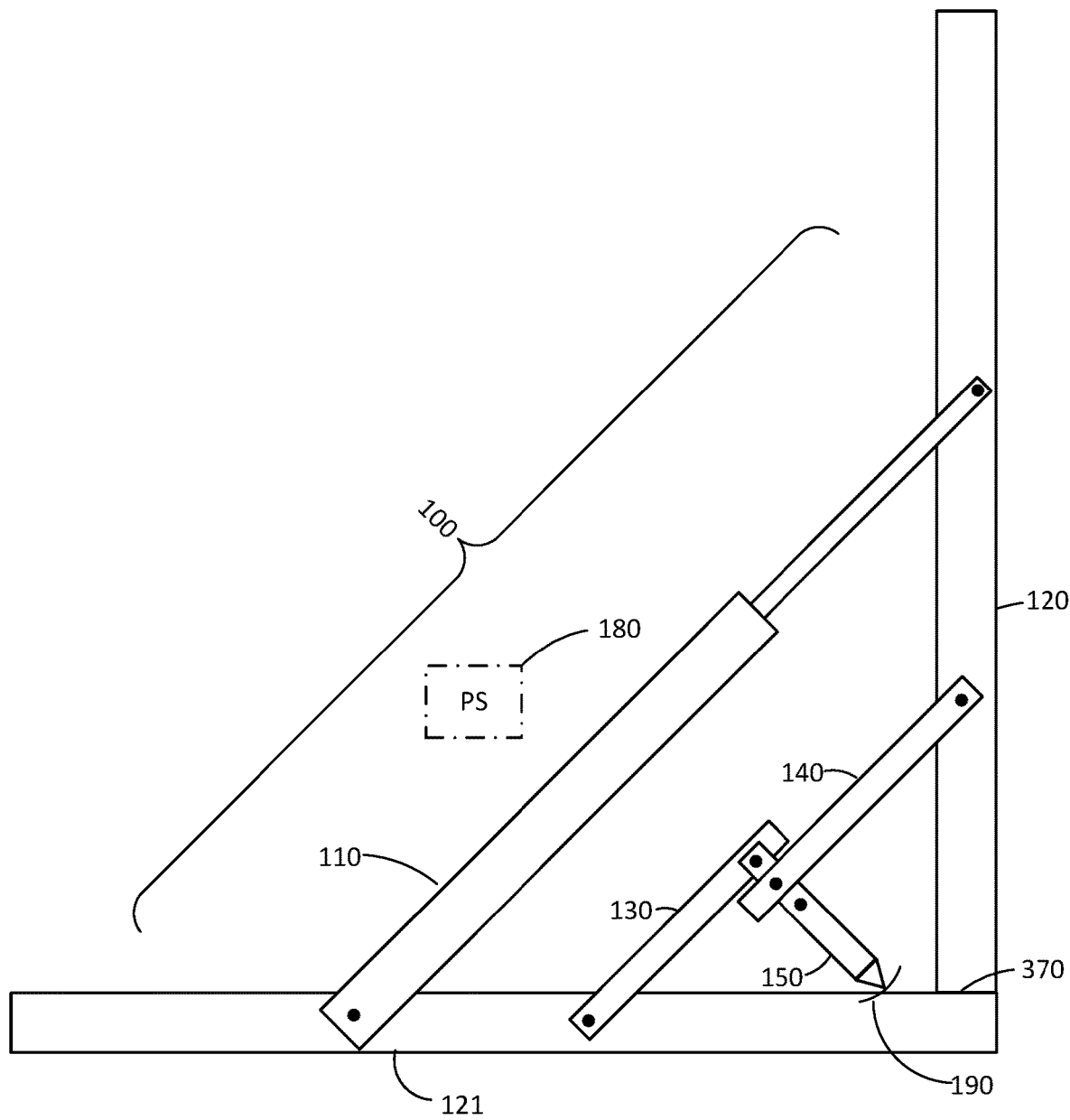
FIG. 12 is a side view sketch of the first (mechanical) embodiment of the movement detector with a cantilevered beam indicator arrow.

There are three embodiments of the movement detector:
1. a mechanical movement indicator consisting of levers, linkage and joints assembled to measure a change in the relative orientation of the at least first and second beam
2. an optical movement indicator with a laser-like projector producing a laser-light beam shining on a charged coupled device for detecting a change in the relative orientation of the first and second beam in the beam joint
3. an electrical movement indicator with a strain gauge-like detector to measure the stress on a beam that is in proportion to a change in the relative orientation of the first and second beam of the beam joint FIG. 12 is a side view sketch of the first (mechanical) embodiment of the movement detector with a cantilevered beam indicator arrow. This embodiment comprises a first lever 130 to the first beam 121 and a second lever 140 connected to the second beam. The first lever 130 and the second lever 140 are slidably connected to each other to detect movement between the first and second beam in the beam joint. The indicator arrow 150 is cantilevered to magnify any movement between the first and second beam in the beam joint.

Figure 13:
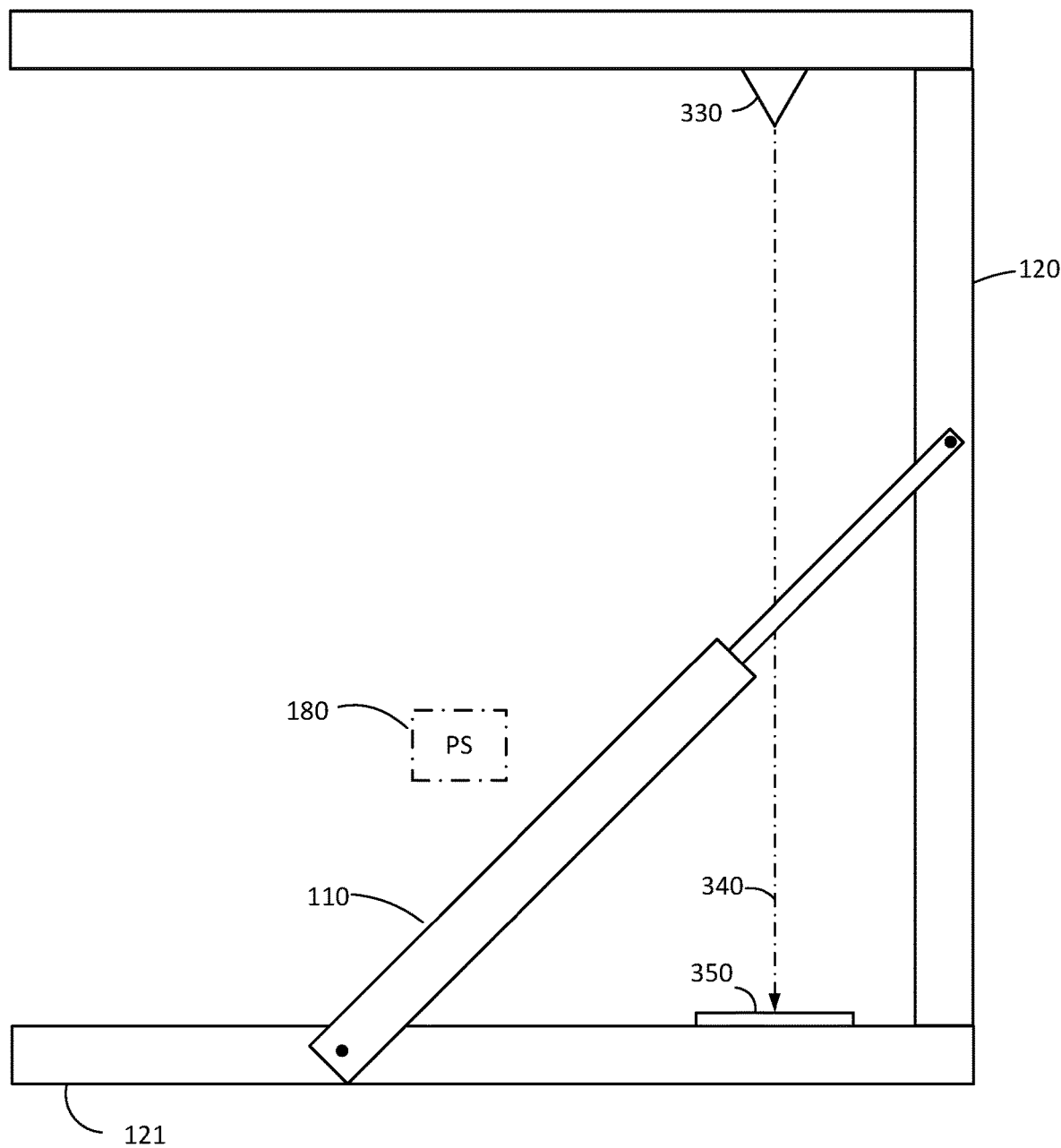
FIG. 13 is a side view sketch of the second (optical) embodiment of the movement detector.

FIG. 13 is a side view sketch of the second (optical) embodiment of the movement detector. A laser-light 330 beam 340 shines on a charged coupled device 350 to detect any change in the relative orientation of the first and second beam in the beam joint.

Figure 14:
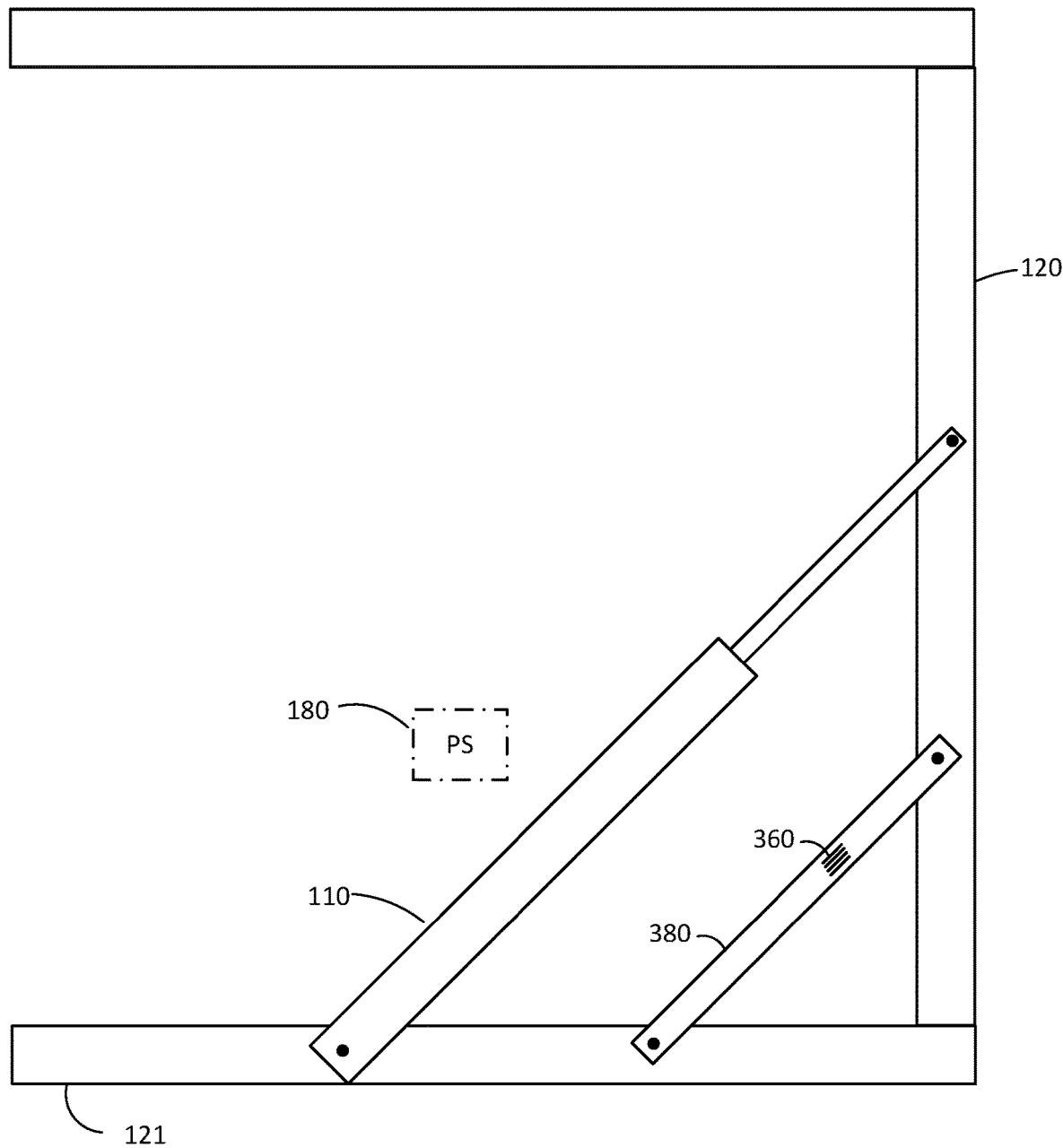
FIG. 14 is a side view sketch of the third (electrical)) embodiment of the movement detector.

FIG. 14 is a side view sketch of the third (electrical)) embodiment of the movement detector. A strain gauge-like detector 360 is mounted on a detection beam 380 which will stretch or compress with any change in the relative orientation of the first and second beam of the beam joint.

Figure 15:
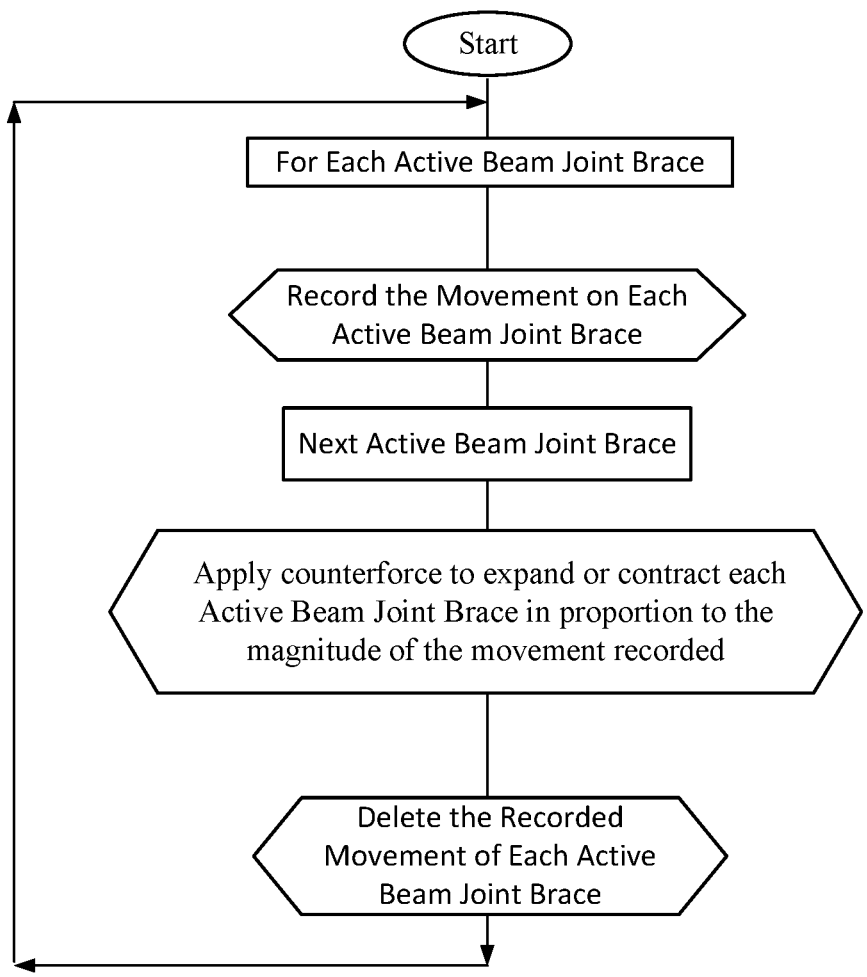
FIG. 15 is a logic flow chart of a sample algorithm in embodiment 2 of the active beam joint brace.

FIG. 15 is a logic flow chart of a sample cyclic algorithm in embodiment 2 of the active beam joint brace in which the counteracting forces and direction are applied to each beam joint in proportion to the amount of movement on each beam joint.

The invention claimed is:

1. An active beam joint brace for a beam joint, the beam joint formed from the intersection of a first beam and a second beam, the first beam and the second beam and the beam joint constituting a portion of a beam structure, the beam joint brace positioned a predefined distance from the beam joint, the active beam joint brace designed and constructed to urge the first beam and the second beam to return to an equilibrium orientation relative to each other when said first and second beams are in an out-of-equilibrium orientation relative to each other due to external forces on the beam structure, the active beam joint brace comprising:
  a bi-directional movement detector, the bi-directional movement detector initialized at an equilibrium setting when said first and second beams are at an equilibrium orientation relative to each other, the movement detector designed and constructed to detect when said first and second beams move to an out-of-equilibrium orientation relative to each other, the bi-directional movement detector having a bi-directional lower trigger threshold for determining when the beam structure is distorted, and wherein the movement detector is selected from the group consisting of:
    a mechanical movement indicator consisting of levers, linkage and joints assembled to measure a proportional change in the relative orientation of the first and second beams, and
    an optical movement indicator consisting of a laser-like projector for producing a laser-light beam and a charged coupled device-like receiver for detecting the location of the laser-light beam on the charged coupled device-like receiver, the optical movement indicator positioned to measure a proportional change in the relative orientation of the first and second beams, and
    an electrical movement indicator consisting of a strain gauge-like detector mounted on an indicator beam, the electrical movement indicator constructed to measure proportional change in the relative orientation of the first and second beams, and
  a bi-directional power supply, the bi-directional power supply operationally connected to the bi-directional movement detector, and
  a bi-directional solenoid, the bi-directional solenoid designed and constructed to urge the first beam and the second beam to an equilibrium orientation relative to each other when said first beam and a second beam are in an out-of-equilibrium orientation relative to each other, the bi-directional solenoid operationally connected to the bi-directional power supply, the bi-directional solenoid technology is selected from the group consisting of hydraulic, electrical and pneumatic, and whereafter a predetermined number of active beam joint braces are installed at the predefined distance from a predetermined number of beam joints within the beam structure, and whereafter the bi-directional movement detector causes the bi-directional solenoids to automatically urge each of the said first and second beams back to an equilibrium orientation relative to each other when said first and second beams are detected to be in an out-of-equilibrium orientation relative to each other, and wherein the external forces are selected from the group consisting of wind, earthquakes, earth movement, explosions and impacts by foreign objects, and wherein the beam structure is selected from the group comprising at least buildings and bridges.

2. An active beam joint brace method, the beam joint formed from the intersection of a first beam and a second beam, the first beam and the second beam and the beam joint constituting a portion of the beam structure, the beam joint brace positioned a predefined distance from the beam joint, the active beam joint brace designed and constructed to cause the first beam and the second beam to return to an equilibrium orientation relative to each other when said first and second beams are in an out-of-equilibrium orientation relative to each other due to external forces on the beam structure, the active beam joint brace comprising:
  providing an active beam joint brace, the active beam joint brace for protecting the beam structure from external forces, the active beam joint brace comprising:
    a bi-directional movement detector, the bi-directional movement detector initialized at an equilibrium setting when said first and second beams are at an equilibrium orientation relative to each other, the movement detector designed and constructed to detect when said first and second beams move to an out-of-equilibrium orientation relative to each other, the bi-directional movement detector having a bi-directional lower trigger threshold for determining when the beam structure is distorted, and wherein the movement detector is selected from the group consisting of:
      a mechanical movement indicator consisting of levers, linkage and joints assembled to measure a proportional change in the relative orientation of the first and second beams, and
      an optical movement indicator consisting of a laser-like projector for producing a laser-light beam and a charged coupled device-like receiver for detecting the location of the laser-light beam on the charged coupled device-like receiver, the optical movement indicator positioned to measure a proportional change in the relative orientation of the first and second beams, and
      an electrical movement indicator consisting of a strain gauge-like detector mounted on an indicator beam, the electrical movement indicator constructed to measure proportional change in the relative orientation of the first and second beams, and
  providing a bi-directional power supply, the bi-directional power supply operationally connected to the bi-directional movement detector, and providing a bi-directional solenoid, the bi-directional solenoid designed and constructed to urge the first beam and the second beam to an equilibrium orientation relative to each other when said first beam and a second beam are in an out-of-equilibrium orientation relative to each other, the bi-directional solenoid operationally connected to the bi-directional power supply, the bi-directional solenoid technology is selected from the group consisting of hydraulic, electrical and pneumatic, and installing a predetermined number of active beam joint braces near a predetermined distance from a predetermined number of beam joints, and whereafter a predetermined number of active beam joint braces are installed at the predefined distance from a predetermined number of beam joints within the beam structure, and whereafter the bi-directional movement detector causes the bi-directional solenoids to automatically urge each of the said first and second beams back to an equilibrium orientation relative to each other when said first and second beams are detected to be in an out-of-equilibrium orientation relative to each other, and wherein the external forces are selected from the group consisting of wind, earthquakes, earth movement, explosions and impacts by foreign objects, and wherein the beam structure is selected from the group comprising at least buildings and bridges.

3. An active beam joint brace for a beam joint, the beam joint formed from the intersection of a first beam and a second beam, the first beam and the second beam and the beam joint constituting a portion of the beam structure, the beam joint brace positioned a predefined distance from the beam joint, the active beam joint brace designed and constructed to cause the first beam and the second beam to return to an equilibrium orientation relative to each other when said first and second beams are in an out-of-equilibrium orientation relative to each other due to external forces on the beam structure, the active beam joint brace comprising:

a bi-directional movement detector, the bi-directional movement detector initialized at an equilibrium setting when said first and second beams are at an equilibrium orientation relative to each other, the movement detector designed and constructed to detect when said first and second beams move to an out-of-equilibrium orientation relative to each other, the bi-directional movement detector having a bi-directional lower trigger threshold for determining when the beam structure is distorted, and wherein the movement detector is selected from the group consisting of:

a mechanical movement indicator consisting of levers, linkage and joints assembled to measure a proportional change in the relative orientation of the first and second beams, and an optical movement indicator consisting of a laser-like projector for producing a laser-light beam and a charged coupled device-like receiver for detecting the location of the laser-light beam on the charged coupled device-like receiver, the optical movement indicator positioned to measure a proportional change in the relative orientation of the first and second beams, and an electrical movement indicator consisting of a strain gauge-like detector mounted on an indicator beam, the electrical movement indicator constructed to measure proportional change in the relative orientation of the first and second beams, and a computer, the computer for monitoring the bi-directional movement detector and for determining the magnitude and direction of the force to be exerted by the bi-directional solenoid on the said first and second beam when said bi-directional movement detector indicates that the first and second beam are in an out-of-equilibrium orientation relative to each other, the computer in communication with the bi-directional movement detector, and an algorithm for determining the magnitude and the direction and the timing of the force to be exerted on said first and second beams, the algorithm designed and constructed to operate within the computer, a bi-directional power supply, the bi-directional power supply operationally connected to the computer, and a bi-directional solenoid, the bi-directional solenoid designed and constructed to urge the first beam and the second beam to an equilibrium orientation relative to each other when said first beam and a second beam are in an out-of-equilibrium orientation relative to each other, the bi-directional solenoid operationally connected to the bi-directional power supply, the bi-directional solenoid technology is selected from the group consisting of hydraulic, electrical and pneumatic, and whereafter a predetermined number of active beam joint braces are installed at the predefined distance from a predetermined number of beam joints within the beam structure, and whereafter the bi-directional movement detector causes the bi-directional solenoids to automatically urge each of the said first and second beams back to an equilibrium orientation relative to each other when said first and second beams are detected to be in an out-of-equilibrium orientation relative to each other, and wherein the external forces are selected from the group consisting of wind, earthquakes, earth movement, explosions and impacts by foreign objects, and wherein the beam structure is selected from the group comprising at least buildings and bridges.

\* \* \* \* \*